US012119583B2

(12) United States Patent
Kondo

(10) Patent No.: US 12,119,583 B2
(45) Date of Patent: Oct. 15, 2024

(54) CONNECTOR

(71) Applicant: Yazaki Corporation, Tokyo (JP)

(72) Inventor: Fuminori Kondo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 372 days.

(21) Appl. No.: 17/843,315

(22) Filed: Jun. 17, 2022

(65) Prior Publication Data

US 2022/0416463 A1 Dec. 29, 2022

(30) Foreign Application Priority Data

Jun. 21, 2021 (JP) ................................. 2021-102172

(51) Int. Cl.
*H01R 13/405* (2006.01)
*H01R 43/24* (2006.01)

(52) U.S. Cl.
CPC ........... *H01R 13/405* (2013.01); *H01R 43/24* (2013.01); *H01R 2201/26* (2013.01)

(58) Field of Classification Search
None
See application file for complete search history.

(56) References Cited

U.S. PATENT DOCUMENTS

| | | | | |
|---|---|---|---|---|
| 6,102,739 A * | 8/2000 | Murakami | H01R 13/5216 | 439/587 |
| 6,527,989 B1 * | 3/2003 | Onoda | B29C 45/14639 | 264/277 |
| 8,480,421 B2 * | 7/2013 | Yoshioka | H01R 43/24 | 439/275 |
| 9,033,734 B2 * | 5/2015 | Tanaka | H01R 13/5845 | 439/587 |
| 9,379,476 B2 * | 6/2016 | Tanaka | H01R 13/514 | |
| 9,397,440 B2 * | 7/2016 | Mori | H01R 13/52 | |
| 9,831,590 B2 * | 11/2017 | Onimoto | H01R 13/405 | |
| 10,014,622 B2 * | 7/2018 | Kondo | H01R 13/521 | |
| 10,998,663 B2 * | 5/2021 | Kondo | H01R 13/5216 | |
| 2015/0214655 A1 * | 7/2015 | Mori | H01R 13/504 | 439/606 |
| 2022/0302640 A1 * | 9/2022 | Pasetti | H01R 13/53 | |

FOREIGN PATENT DOCUMENTS

JP 3467471 B2 11/2003

* cited by examiner

*Primary Examiner* — Ross N Gushi
(74) *Attorney, Agent, or Firm* — Sughrue Mion, PLLC

(57) ABSTRACT

A connector includes a plurality of terminals, a first member made from a first resin to cover a part of a surface of each of the plural terminals, and a second member made from a second resin to cover a part of the surface of each of the plural terminals and a surface of the first member on the side opposite to the respective terminals. The plural terminals each project to be exposed from the surface of the second member. The first resin has breaking energy of 2 J or greater in a transverse direction. The second resin has a comparative tracking index of 400 V or greater.

6 Claims, 3 Drawing Sheets

CONNECTOR

CROSS-REFERENCE TO RELATED APPLICATIONS

The present application is based on, and claims priority from Japanese Patent Application No. 2021-102172, filed on Jun. 21, 2021, the entire contents of which are incorporated herein by reference.

TECHNICAL FIELD

The present disclosure relates to a connector.

BACKGROUND

An electrical device including a solenoid is housed in a mission case of an automatic transmission together with automatic transmission fluid (ATF). The electrical device is electrically connected to an exterior control device of the mission case via a connector provided at an opening of the mission case. Such a connector is required to avoid a leakage of the ATF in the mission case through terminals of the connector, or to prevent moisture outside the mission case from entering the inside of the mission case.

The terminals made from metal, however, typically have low adhesion to a housing made from resin, and may cause a leakage or entrance of liquid through a boundary between the terminals made from metal and the housing made from resin. In view of this, a fine gap should be prevented that is caused at the boundary between the resin and the metal. JP 3467471B discloses a method of manufacturing a resin composite molded article for preventing such a gap. This manufacturing method preliminarily subjects a surface of a metal component to chemical etching, and inserts the metal component to a metal die of an injection molding machine so as to inject and mold specific thermoplastic resin.

SUMMARY

The conventional technique would be able to avoid a separation of the molded article at the boundary between the metal and the resin caused during a cooling process of the molded article or under the used circumstances. However, the metal and the resin have different coefficients of linear expansion, and cracks thus may be caused in the resin because the metal does not follow the resin when the resin expands or contracts during a solidification process of the resin or due to fluctuations in temperature under the used circumstances.

The connector is also required to have a small size in addition to sealing properties. However, a distance between the respective terminals is decreased if the size of the connector is simply decreased, which may impede the insulation between the respective terminals.

To solve the conventional problems as described above, the present disclosure provides a connector having high sealing properties with a size reduced.

A connector according to an aspect of the present disclosure includes a plurality of terminals, a first member made from a first resin to cover a part of a surface of each of the plural terminals, and a second member made from a second resin to cover a part of the surface of each of the plural terminals and a surface of the first member on a side opposite to the respective terminals. The plural terminals each project to be exposed from a surface of the second member. The first resin has breaking energy of 2 J or greater in a transverse direction. The second resin has a comparative tracking index of 400 V or greater.

According to the present disclosure, there can be provided the connector having high sealing properties with a size reduced.

DETAILED DESCRIPTION

Figure 1:
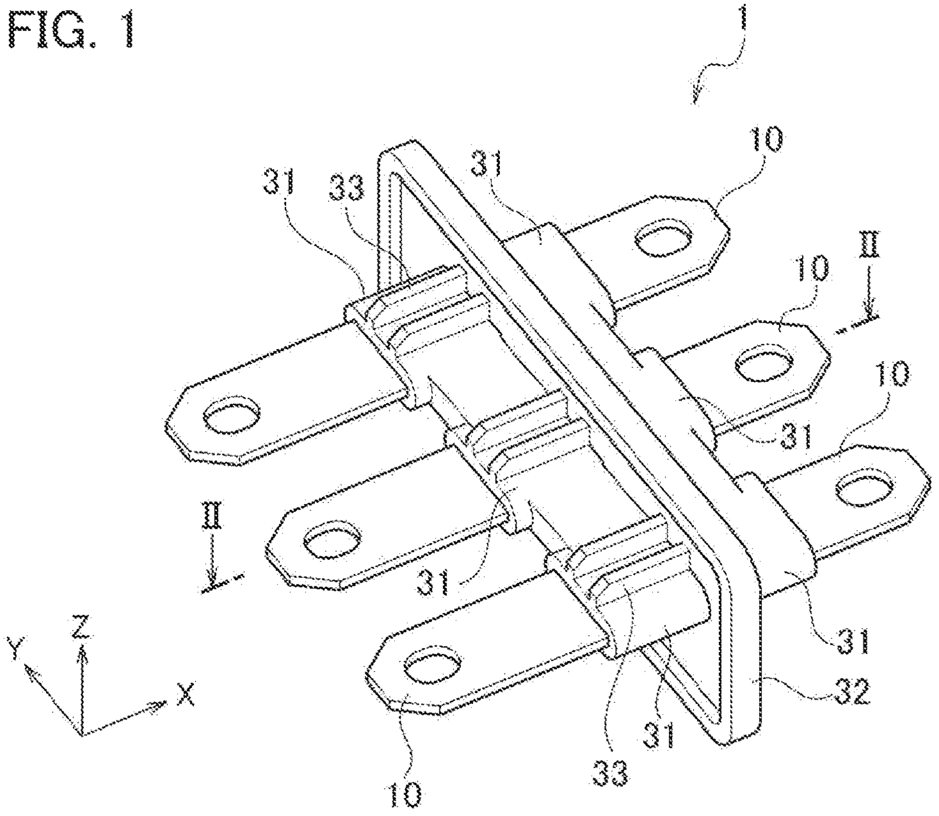
FIG. 1 is a perspective view showing an example of a connector according to the present embodiment.

A connector according to the present embodiment is described in detail below with reference to the drawings. The dimensional ratios of the elements in the drawings are exaggerated for illustration purposes, and are not necessarily drawn to scale.

Figure 2:
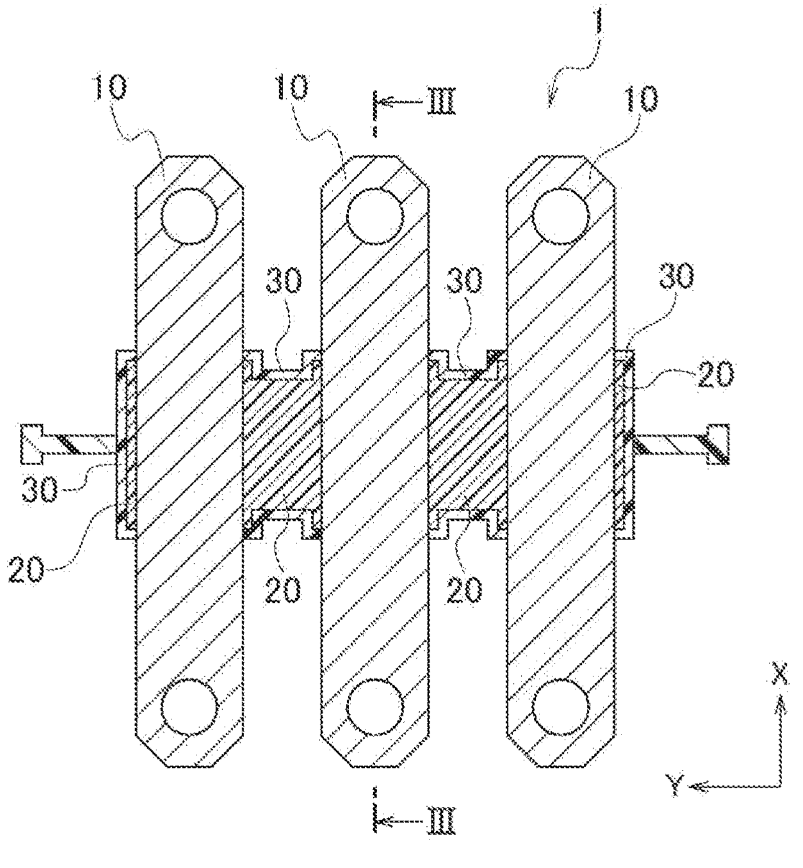
FIG. 2 is a cross-sectional view taken along line II-II in FIG. 1.
Figure 3:
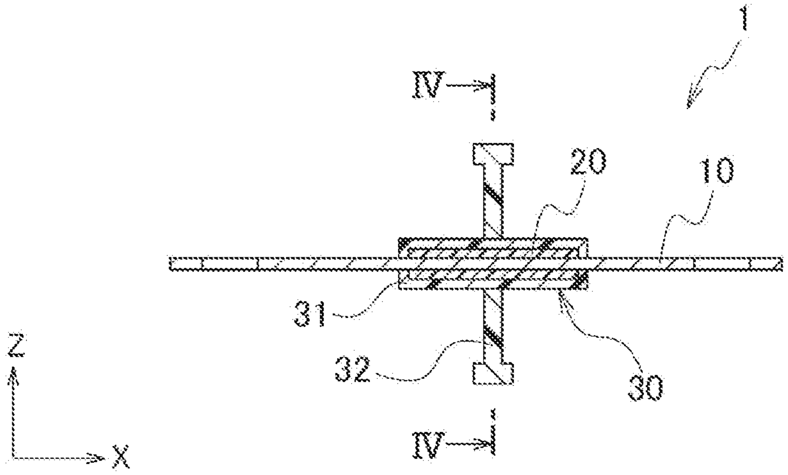
FIG. 3 is a cross-sectional view taken along line III-III in FIG. 2.
Figure 4:
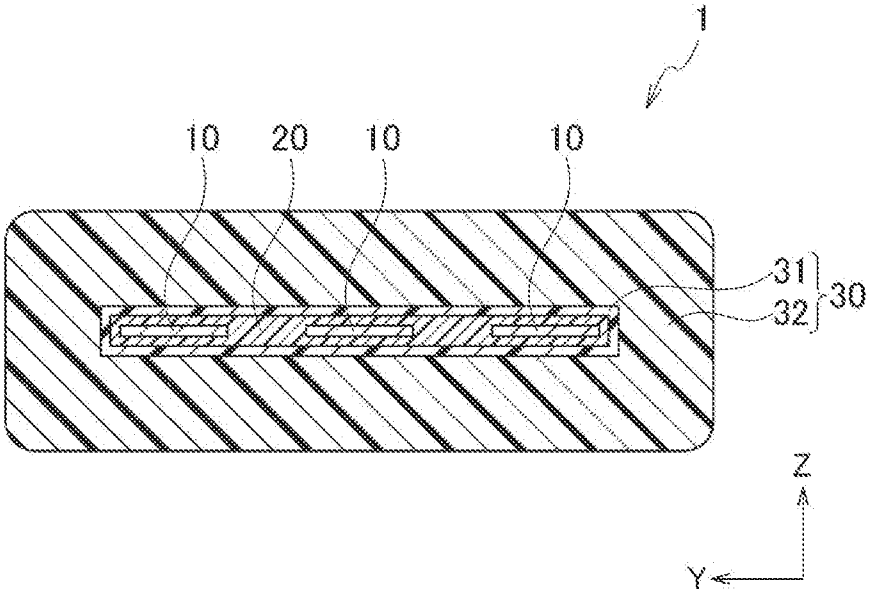
FIG. 4 is a cross-sectional view taken along line IV-IV in FIG. 3.

FIG. 1 is a perspective view showing an example of a connector 1 according to the present embodiment. FIG. 2 is a cross-sectional view taken along line II-II in FIG. 1. FIG. 3 is a cross-sectional view taken along line III-III in FIG. 2. FIG. 4 is a cross-sectional view taken along line IV-IV in FIG. 3. In the drawings, a connected direction of the connector in which terminals 10 are connected (a longitudinal direction of the terminals 10) is defined as an X direction, a short-side direction of the terminals 10 is defined as a Y direction, and a thickness direction of the terminals 10 is defined as a Z direction. The X direction, the Y direction, and the Z direction are perpendicular to each other. As shown in FIG. 1 to FIG. 4, the connector 1 includes the plural terminals 10, a first member 20, and a second member 30.

The respective terminals 10 are arranged while spaces are interposed therebetween in the arrangement direction. While the present embodiment is illustrated with the connector 1 including the three terminals 10, the number of the terminals 10 may be determined as appropriate. The respective terminals 10 project to be exposed from the surface of the second member 30. The part of the respective terminals 10 exposed to the external space is electrically connected to the corresponding mating terminal (not illustrated). The both ends of the respective terminals 10 of the connector 1 can be connected with two different mating terminals.

The respective terminals 10 have a rectangular column-like shape having a short axis in a direction parallel to the arrangement direction of the terminals 10 (the Y direction) and a long axis in a direction perpendicular to the arrangement direction of the terminals 10 (the X direction). The shape of the respective terminals 10 is not limited to the shape as illustrated, and may be any shape such as a cylindrical shape. The respective terminals 10 may be provided with steps. The respective terminals 10 may have the same shape, or may have different shapes.

The respective terminals 10 are made from conductive material. The material used for the respective terminals 10 may include at least one metal selected from the group consisting of pure copper, a copper alloy, pure aluminum, an aluminum alloy, and stainless steel. The surface of the respective terminals 10 may be, but not necessarily, subjected to plating.

The surface of the respective terminals 10 may be provided with projections and recesses so as to improve adhesion to the first member 20 or the second member 30. The projections and recesses can be provided by chemical or physical etching, for example. Examples of etching include blast treatment, medical-fluid treatment, and laser treatment. The projections and recesses may be provided on the plated surface of the respective terminals 10. The respective terminals 10 may be bonded to the first member 20 or the second member 30 via an adhesive.

The first member 20 covers a part of the surface of the respective terminals 10. In other words, another part of the respective terminals 10 is exposed to the external space. The first member 20 may cover at least a part of an outer circumferential surface of the respective terminals 10 in the short-axis direction, or may cover to surround the entire circumference of the respective terminals 10.

The connector 1 may include the plural first members 20 separated from each other, or may include the single continuous first member 20. When the connector 1 includes the plural first members 20, the respective first members 20 may cover the surfaces of the corresponding terminals 10. When the connector 1 includes the single continuous first member 20, the first member 20 may cover the respective surfaces of the terminals 10.

A first resin preferably has a tensile strength of 50 MPa or greater in the direction (the Y direction or the Z direction) perpendicular to the longitudinal direction (the X direction) of the respective terminals 10, and more preferably 60 MPa or greater. The longitudinal direction of the respective terminals 10 typically corresponds to a machine direction (MD). The direction perpendicular to the longitudinal direction of the respective terminals 10 typically corresponds to a transverse direction (TD). When the tensile strength of the first resin in the TD is large, cracks or separations caused around the respective terminals 10 can be avoided or decreased.

The first member 20 is made from the first resin. The first resin has breaking energy of two joules (J) or greater in the TD. The first resin having the breaking energy of 2 J or greater in the TD has both rigidity and flexibility. The energy of the first resin to be absorbed until being broken is thus high if the first resin or a second resin expands or contracts during solidification of the resin upon molding or due to fluctuations in temperature after the molding. This avoids the separation of the first member 20 from the respective terminals 10 or avoids the cause of cracks in the first member 20. Since the leakage or entrance of liquid through the boundary between the respective terminals 10 and the first member 20 or through the cracks can be avoided, the connector 1 having high sealing properties can be obtained. The breaking energy in the TD is more preferably 3 J or greater, and still more preferably 4 J or greater. The first resin may have higher breaking energy in the TD than the second resin.

The first member 20 covering the respective terminals 10 preferably has the properties capable of avoiding cracks when a cycle of a process is repeated 1000 times in which the first member 20 is cooled at −40° C. for 30 minutes and then heated at 150° C. for 30 minutes. When any cracks are not caused in the first member 20 under such conditions, the connector 1 can keep the sealing properties under serious circumstances, such as circumstances in vehicles, in which fluctuations between a high-temperature state and a low-temperature state are repeated. The present embodiment thus can provide the connector 1 having high reliability.

The first resin includes thermoplastic resin, for example. The first resin preferably includes at least one of engineering plastic or super engineering plastic. The engineering plastic may include at least one resin selected from the group consisting of polybutylene terephthalate (PBT), polyamide 66 (PA66), and polyamide 6 (PA6). The super engineering plastic may include at least one resin selected from the group consisting of liquid crystal polymer (LCP), polyphenylene sulfide (PPS), aromatic polyamide (PA6T), and syndiotactic polystyrene (SPS). Among these, the first resin preferably includes at least one of polyphenylene sulfide (PPS) or polybutylene terephthalate (PBT) that has a low dimensional change derived from water absorption and has a small difference in the coefficient of linear expansion between the MD and the TD.

The first resin may include filler so as to have various kinds of functions. The first resin may include at least one kind of filler selected from the group consisting of glass fiber, carbon fiber, and aramid fiber. The first resin including such filler has a small coefficient of linear expansion, so as to decrease a difference in the coefficient of linear expansion between the first resin and the respective terminals 10. This can reduce the influence of the thermal expansion and the thermal contraction on the resin.

The second member 30 covers a part of the surface of the respective terminals 10 and the surface of the first member 20 on the side opposite to the respective terminals 10. A part of the second member 30 is in contact with the respective terminals 10 via the first member 20, and the other part is in direct contact with the respective terminals 10. The second member 30 covers the entire circumference of the first member 20 in addition to the respective terminals 10 so that the first member 20 is isolated from the external space by the second member 30. Namely, the first member 20 is not exposed to the external space.

The respective terminals 10 project to be exposed from the surface of the second member 30. The second member 30 may include terminal holding parts 31 and a flange 32. The respective terminal holding parts 31 and the flange 32 are continuously integrated with each other. The respective terminal holding parts 31 have a rectangular cylindrical shape, and cover the circumferences of the respective terminals 10. The terminal holding parts 31 are provided with ribs 33 projecting from the surfaces thereof. The flange 32 is provided at the circumference of the respective terminal holding parts 31, and extends into a flat plate-like shape extending in the Y direction and the Z direction from the respective terminal holding parts 31.

The second member 30 is made from the second resin. The second resin has a comparative tracking index of 400 V or greater. The second resin, when having the comparative tracking index of 400 V or greater, can avoid electrical breakdown between the plural terminals 10, so as to contribute to a decrease in distance between the respective terminals 10. This can reduce the regions in which the connector 1 holds the respective terminals 10, contributing to a reduction in size of the connector 1 accordingly. The comparative tracking index of the second resin may be 600 V or greater. The comparative tracking index of the second resin is preferably large as much as possible. For example, the comparative tracking index may be 10000 V, although the upper limit is not limited to a specific value. The second resin may have a larger comparative tracking index than the first resin.

The comparative tracking index can be measured according to the prescriptions of JIS C2134:2007 (IEC 60112: 2003). The comparative tracking index is a value indicating a maximum voltage that the resin can withstand a period for 50 drops of a measurement solution without causing tracking failure or a persistent flame occurring. The term "tracking failure" means the electrical breakdown caused by tracking between conduction members. The term "tracking" means that conductive paths are gradually formed due to composite actions of electrolysis and electrolytic pollution caused on the surface or inside a solid insulating material or both on the surface and inside the solid insulating material.

According to the UL standards, the comparative tracking index of 600 V or greater is defined as PLC0, the comparative tracking index of 400 V or greater and less than 600 V is defined as PLC1, the comparative tracking index of 250 V or greater and less than 400 V is defined as PLC2, and the comparative tracking index of 175 V or greater and less than 250 V is defined as PLC3. The comparative tracking index of 100 V or greater and less than 175 V is defined as PLC4, and the comparative tracking index of 100 V or less is defined as PLC5.

The second resin when impregnated with oil at 150° C. for 1000 hours preferably has flexural strength of 85% or greater with respect to that of the second resin without being impregnated with oil. The second resin, when having the flexural strength of 85% or greater, allows the connector 1 to be used for a part in contact with oil such as hydraulic oil in vehicles. The oil to be used is automatic transmission fluid, for example. The automatic transmission fluid is ACDelco DEXRON (registered trademark) VI available from General Motors Company, for example. The flexural strength can be measured at a test speed of 10 mm/min at a room temperature (about 23° C.) according to the prescriptions of ASTM D790.

The second resin includes thermoplastic resin, for example. The second resin preferably includes super engineering plastic that has high heat resistance and oil resistance. In particular, the second resin preferably includes at least one resin selected from the group consisting of polyphenylene sulfide (PPS), syndiotactic polystyrene (SPS), polyamide (PA) including aromatic polyamide (PA6T), and liquid crystal polymer (LCP). Among these, the second resin preferably includes at least one of polyphenylene sulfide (PPS) or syndiotactic polystyrene (SPS) that particularly has high heat resistance and oil resistance. The second resin may include the same kind of resin as the first resin, or may include another kind of resin different from the first resin.

The second resin may include filler so as to have various kinds of functions. The second resin may include at least one kind of filler selected from the group consisting of glass fiber, carbon fiber, and aramid fiber. The second resin including such filler has a small coefficient of linear expansion, so as to decrease a difference in the coefficient of linear expansion between the second resin and the respective terminals 10. This can reduce the influence of the thermal expansion and the thermal contraction on the resin.

An adhesive may be applied to a boundary between the first member 20 and the second member 30, or the first member 20 and the second member 30 may be bonded directly to each other. The adhesive to be used may be any type that can bond the first member 20 and the second member 30 together. A method of directly bonding the first member 20 and the second member 30 can be determined as appropriate, and the first member 20 and the second member 30 may be bonded to each other by a known welding method, such as two-color molding, vibration welding using ultrasonic waves, laser welding, and friction stir welding (FSW), for example. The first member 20 may be subjected to chemical surface treatment or physical surface treatment before the direct bonding.

A process of manufacturing the connector 1 according to the present embodiment is described below. The manufacturing method for the connector 1 includes a first step and a second step, for example. The first step is to form the first member 20 from the first resin to cover a part of the surface of the respective terminals 10. The second step is to form the second member 30 from the second resin to cover a part of the surface of the respective terminals 10 and the surface of the first member 20 on the side opposite to the respective terminals 10.

The surface of the respective terminals 10 may have an anchor structure provided with projections and recesses patterned by laser processing at depths and intervals in the submillimeter order. The respective terminals 10 having the anchor structure allow the first resin and the second resin to enter the recesses on the surfaces of the terminals 10 and cause the first member 20 and the second member 30 to closely adhere to each other, so as to lead the connector 1 to have high resistance to liquid.

The first member 20 and the second member 30 can be formed by injection molding, for example. The first member 20 and the second member 30 may be bonded to each other by two-color molding. Alternatively, the first member 20 may be subjected to surface treatment before the formation of the second member 30, followed by the step of bonding the first member 20 and the second member 30 to each other. Alternatively, an adhesive may be applied to the surface of the first member 20 so as to bond the first member 20 and the second member 30 to each other. Alternatively, the first member 20 and the second member 30 may be bonded to each other by a known welding method, such as vibration welding using ultrasonic waves and laser welding.

As described above, the connector 1 according to the present embodiment includes the plural terminals 10, and the first member 20 made from the first resin to cover a part of the surface of the respective terminals 10. The connector 1 further includes the second member 30 made from the second resin to cover a part of the surface of the respective terminals 10 and the surface of the first member 20 on the side opposite to the respective terminals 10. The respective terminals 10 project to be exposed from the surface of the second member 30. The first resin has the breaking energy of 2 J or greater in the TD. The second resin has the comparative tracking index of 400 V or greater.

The first member 20 made from the first resin covers a part of the surface of the respective terminals 10, in which the first resin has the breaking energy of 2 J or greater. Since the first resin having the breaking energy of 2 J or greater in the TD has both strength and flexibility, the energy of the first resin to be absorbed until being broken is high if the first resin or the second resin expands or contracts during solidification of the resin upon molding or due to fluctuations in temperature after the molding. This avoids the separation of the first member 20 from the respective terminals 10 or avoids the cause of cracks in the first member 20. The leakage or entrance of liquid through the boundary between the respective terminals 10 and the first member 20 or through the cracks can be avoided, so as to provide the connector 1 having high sealing properties.

The second member 30 made from the second resin covers a part of the surface of the respective terminals 10 and the surface of the first member 20, and the respective terminals 10 project to be exposed from the surface of the second member 30. The second resin having the comparative tracking index of 400 V or greater leads the respective terminals 10 to have the high insulating properties, so as to contribute to a decrease in distance between the respective terminals 10. The connector 1 with the size reduced thus can be provided.

Since the first member 20 is made from the first resin, and the second member 30 is made from the second resin, as described above, the connector 1 can also be formed integrally by two-color molding. This can eliminate an O-ring or a holder made from acrylic resin typically used in a conventional connector in order to ensure the sealing properties. This also contributes to a further reduction in size of the connector 1.

As described above, the present embodiment can provide the connector 1 having the high sealing properties with the size reduced. The connector 1 according to the present embodiment described above can be suitably used for a tightly-sealed structure for electronic apparatuses, onboard/electric components, transformer/coil power modules, and wire harnesses for devices, relays, and sensors. The connector 1 according to the present embodiment can be used not only for underfloor harnesses or harnesses for air conditioners for vehicles such as automobiles, but also for motor harnesses (such as motor connectors or motor terminal blocks) with an oil-cooling structure and connectors for transmission.

EXAMPLES

The present embodiment is described in more detail below with reference to Examples and Comparative Examples, but is not limited to these examples described below.

Examples and Comparative Examples used the following materials for the first resin and the second resin:

Polyphenylene sulfide (PPS): Torelina (registered trademark) A675 GS1; PPS-I-(GF+MD) 50, available from Toray Industries, Inc.

Polyphenylene sulfide (PPS): Torelina (registered trademark) A660 EX; PPS-I-(GF+MD) 65, available from Toray Industries, Inc.

Syndiotactic polystyrene (SPS): XAREC (registered trademark) C142; PS-ST-GF40, available from Idemitsu Kosan Co., Ltd.

Polybutylene terephthalate (PBT): DURANEX (registered trademark) 531HS; PBT-I-GF30, available from Polyplastics Co., Ltd.

[Evaluation]

The first resin and the second resin were evaluated with regard to the following items.

<Tensile Test>

A sample of the first resin having a length of 60 mm, a width of 20 mm, and a thickness of 2 mm was prepared in which a direction perpendicular to a flow direction upon the injection molding, which is a transverse direction (TD), corresponds to a longitudinal direction. A tensile force was then applied to the sample at a speed of 10 mm/min at a room temperature (about 23° C.) by use of a precision universal testing machine, Autograph (registered trademark) AG-1, available from Shimadzu Corporation, so as to measure a tensile strength (MPa) in the TD upon breakage of the test piece. The tensile direction was set to conform to the direction perpendicular to the orientation of fibers.

<Tensile Energy to Break>

The first resin and the second resin were each subjected to the tensile test in the same manner as described above, so as to obtain breaking energy in accordance with a S-S curve indicating the relationship between stress (tensile strength) and strain (elongation). In particular, the tensile energy to break in the TD was obtained according to the area between the S-S curve and the stress of 0 MPa.

<Crack Causing>

Figure 5:
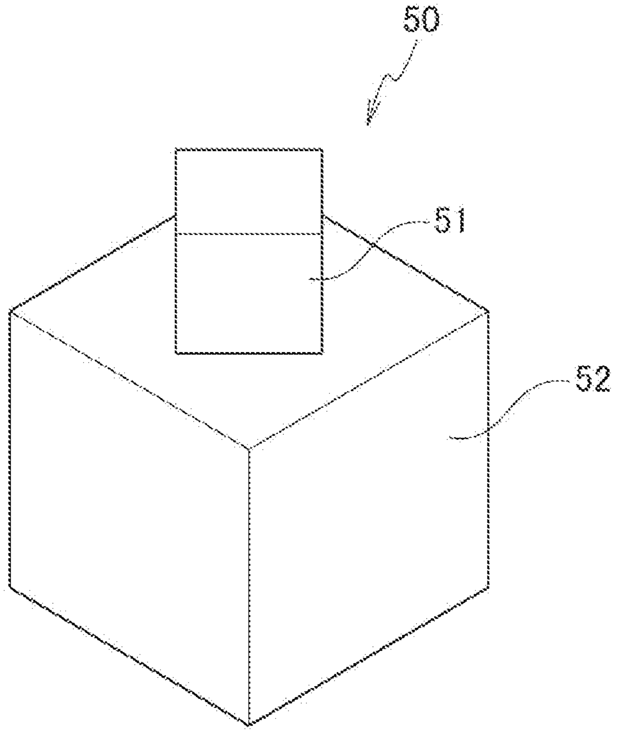
FIG. 5 is a view schematically showing a test piece used in a crack-causing test.
Figure 6:
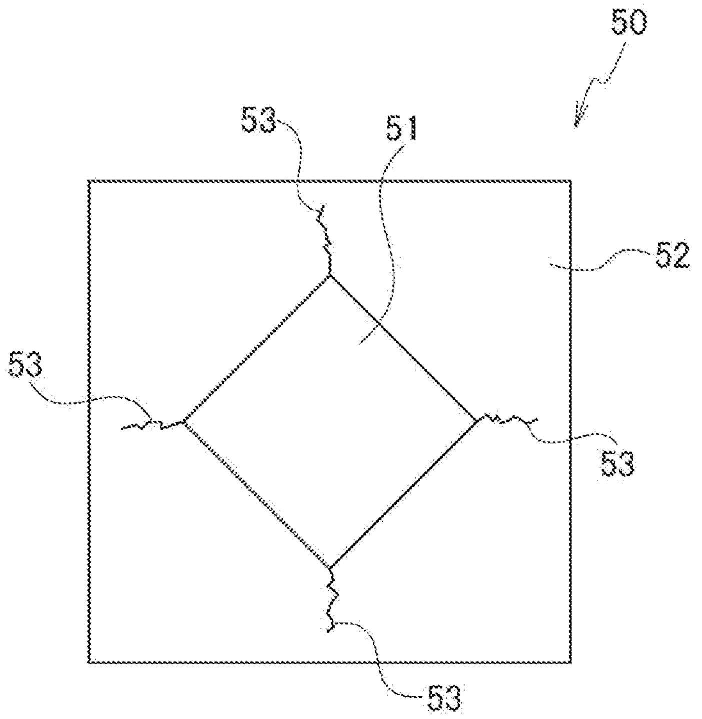
FIG. 6 is a view showing an example of a case in which cracks are caused.

As shown in FIG. 5, the test piece 50 was prepared by the insert molding so that one end of a terminal 51 was exposed and the circumference of the other end of the terminal 51 was covered with the first resin 52. The terminal 51 was made from SUS304 with a coefficient of linear expansion of $17.3\times10^{-6}$/° C. having a rectangular shape of 14 mm×14 mm×46 mm. Although not illustrated, the respective four corners of the terminal 51 were cut into a right-angled isosceles triangle of 0.1 mm. The test piece 50 was then subjected to a cycle of an operation of being cooled at −40° C. for 30 minutes and then heated at 150° C. for 30 minutes, and this cycle was repeated up to 1000 times. The test piece 50 was visually observed, and the number of the cycles until cracks 53 as shown in FIG. 6 were caused was counted. The test piece 50 was visually confirmed every 50 cycles so as to measure the number of the cycles at which the cracks 53 were caused.

<Comparative Tracking Index>

The comparative tracking index was measured according to the prescriptions of JIS C2134:2007 (IEC 60112:2003). In particular, a test piece in which twenty flat plates with 100 mm×100 mm having a thickness of 3 mm were stacked was prepared by use of each of the first resin and the second resin. In addition, a solution A was prepared as a measurement solution. The solution A was prepared such that anhydrous ammonium chloride with an analysis reagent degree of 99.8% or greater was dissolved at about 0.1% in terms of mass percent into deionized water having conductivity of 1 mS/m or less so as to have resistivity of 3.95 Ωm±0.05 Ωm at a temperature of 23° C.±1° C. Subsequently, platinum electrodes were placed on the surface of the test piece, and the solution A was dropped between the platinum electrodes at predetermined time intervals while a voltage was applied between the platinum electrodes. The comparative tracking index to be measured was a maximum voltage at which five test pieces could withstand a period for 50 drops of the solution A without causing tracking failure.

<Flexural Strength>

A test piece made from each of the first resin and the second resin with 127 mm×12.7 mm having a thickness of 1.6 mm was prepared. The respective test pieces were impregnated with automatic transmission fluid (ATF) at 150° C. for 1000 hours, and then removed from the ATF and wiped off to be settled until the respective test pieces returned to a room temperature (about 23° C.). The ATF used was ACDelco DEXRON (registered trademark) VI available from General Motors Company. The respective test pieces were then set in a jig, and subjected to a bending test according to the prescriptions of ASTM D790. The bending test was executed by use of a precision universal testing machine, Autograph (registered trademark) AG-1, available from Shimadzu Corporation, at a speed of 10 mm/min at a room temperature (about 23° C.) so as to measure flexural strength. The bending test was repeated five times for each of the test piece impregnated with the ATF and the test piece without being impregnated with the ATF, and the average of the flexural strength of each test piece was calculated. In addition, the "flexural strength of the second resin impregnated with the ATF" with respect to the "flexural strength of the second resin without being impregnated with the ATF" was also calculated.

TABLE 1

| | | | Example 1 | Example 2 | Example 3 | Example 4 |
|---|---|---|---|---|---|---|
| First Material | Material | A675GS1(PPS) | ○ | ○ | — | — |
| | | 531HS(PBT) | — | — | ○ | ○ |
| | Evaluation | Comparative Tracking Index (V) | 150 | 150 | 550 | 550 |
| | | TD Breaking Energy (J) | 4.12 | 4.12 | 5.73 | 5.73 |
| | | TD Tensile Strength (MPa) | 63.3 | 63.3 | 53.5 | 53.5 |
| | | Crack Causing (number of cycles) | 1000< | 1000< | 1000< | 1000< |
| | | Flexural Strength (%) | 104 | 104 | 79 | 79 |
| Second Material | Material | A660EX(PPS) | — | ○ | — | ○ |
| | | C142(SPS) | ○ | — | ○ | — |
| | Evaluation | Comparative Tracking Index (V) | 550 | 600 | 550 | 600 |
| | | TD Breaking Energy (J) | 1.9 | 0.9 | 1.9 | 0.9 |
| | | Flexural Strength (%) | 89 | 101 | 89 | 101 |
| First Material/ Second Material | Evaluation | Crack Causing (number of cycles) | 1000< | 1000< | 1000< | 1000< |

TABLE 2

| | | | Comparative Example 1 | Comparative Example 2 | Comparative Example 3 |
|---|---|---|---|---|---|
| First Material | Material | A675GS1 (PPS) | ○ | — | — |
| | | A660EX(PPS) | — | ○ | — |
| | | C142(SPS) | — | — | ○ |
| Second Material | Material | A675GS1 (PPS) | ○ | — | — |
| | | A660EX(PPS) | — | ○ | — |
| | | C142(SPS) | — | — | ○ |
| First Material/ Second Material | Evaluation | Comparative Tracking Index (V) | 150 | 600 | 550 |
| | | TD Breaking Energy (J) | 4.12 | 0.9 | 1.9 |
| | | TD Tensile Strength (MPa) | 63.3 | 27 | 48.6 |
| | | Crack Causing (number of cycles) | 1000< | 50 | 200 |
| | | Flexural Strength (%) | 104 | 101 | 89 |

In Example 1, the first resin used was PPS A675GS1, and the second resin used was SPS C142. The first resin had the breaking energy of 2 J or greater in the TD without causing cracks in the first member for 1000 cycles or more, and also had the comparative tracking index of 400 V or greater. In Example 2, the first resin used was PPS A675GS1, and the second resin used was PPS A660EX. The first resin had the breaking energy of 2 J or greater in the TD without causing cracks in the first member for 1000 cycles or more, and also had the comparative tracking index of 400 V or greater. Example 2 also showed good bonding properties between the first resin and the second resin.

In Example 3, the first resin used was PBT 531HS, and the second resin used was SPS C142. The first resin had the breaking energy of 2 J or greater in the TD without causing cracks in the first member for 1000 cycles or more, and also had the comparative tracking index of 400 V or greater. In Example 4, the first resin used was PBT 531HS, and the second resin used was PPS A660EX. The first resin had the breaking energy of 2 J or greater in the TD without causing cracks in the first member for 1000 cycles or more, and also had the comparative tracking index of 400 V or greater.

In Example 1 to Example 4, a connector was manufactured in which terminals were covered with the first resin, and the first resin was further covered with the second resin so as to evaluate the cause of cracks in the same manner as described above. As shown in the row, "first material/second material", in Table 1, no cracks were caused. In Example 1 and Example 2, the "flexural strength of the second resin impregnated with the ATF" with respect to the "flexural strength of the second resin without being impregnated with the ATF" was 85% or greater, and the tolerance to the oil (ATF) was also high. The evaluation also revealed that no cracks were caused in the first member for 1000 cycles or more in Example 1 to Example 4 when the tensile strength in the MD was 50 MPa or greater.

In Comparative Example 1, the first resin and the second resin used were both PPS A675GS1. The first resin had the breaking energy of 2 J or greater in the TD and the tensile strength of 50 MPa or greater in the MD without causing cracks in the first member for 1000 cycles or more, while the comparative tracking index was as low as 150 V. In Comparative Example 2, the first resin and the second resin used were both PPS A660EX. While the comparative tracking index was as high as 400 V or greater, the first resin had the breaking energy of less than 2 J in the TD and the tensile strength of less than 50 MPa in the MD, and cracks were caused in the first member at the 50th cycle. In Comparative Example 3, the first resin and the second resin used were both SPS C142. While the comparative tracking index was as high as 400 V or greater, the first resin had the breaking energy of less than 2 J in the TD and the tensile strength of less than 50 MPa in the MD, and cracks were caused in the first member at the 200th cycle.

The evaluation results of Examples and Comparative Examples revealed that the connector having the high sealing properties with the size reduced is presumed to be available when the first resin has the breaking energy of 2 J or greater in the TD and the second resin has the comparative tracking index of 400 V or greater.

While the present embodiment has been described above with reference to the respective examples, it should be understood that the present embodiment is not intended to be limited to the examples described above, and various modifications can be made within the scope of the present embodiment.

What is claimed is:

1. A connector comprising:

a plurality of terminals;

a first member made from a first resin to cover a part of a surface of each of the plural terminals; and a second member made from a second resin to cover a part of the surface of each of the plural terminals and a surface of the first member on a side opposite to the respective terminals, wherein the plural terminals each project to be exposed from a surface of the second member, the first resin has breaking energy of 2 J or greater in a transverse direction, and the second resin has a comparative tracking index of 400 V or greater.

2. The connector according to claim 1, wherein the second resin has the greater comparative tracking index than the first resin.

3. The connector according to claim 1, wherein a flexural strength of the second resin when impregnated with oil at 150° C. for 1000 hours with respect to a flexural strength of the second resin without being impregnated with the oil is 85% or greater.

4. The connector according to claim 1, wherein the first resin has the greater breaking energy in the transverse direction than the second resin.

5. The connector according to claim 1, wherein:

the first resin includes at least one of polyphenylene sulfide or polybutylene terephthalate; and the second resin includes at least one resin selected from the group consisting of polyphenylene sulfide, syndiotactic polystyrene, polyamide, and liquid crystal polymer.

6. The connector according to claim 1, wherein an adhesive is applied between a boundary between the first member and the second member, or the first member and the second member are directly bonded to each other.

* * * * *